United States Patent [19]
Marotta et al.

[11] Patent Number: 5,704,014
[45] Date of Patent: Dec. 30, 1997

[54] VOLTAGE-CURRENT CONVERSION CIRCUIT EMPLOYING MOS TRANSISTOR CELLS AS SYNAPSES OF NEURAL NETWORK

[75] Inventors: Giulio Marotta, Rieti; Eros Pasero, Turin, both of Italy

[73] Assignee: Texas Instruments Incorporated, Dallas, Tex.

[21] Appl. No.: 828,063

[22] Filed: Jan. 30, 1992

[30] Foreign Application Priority Data

Jan. 31, 1991 [IT] Italy ............... RM.91-A/000075

[51] Int. Cl.$^6$ .................. H03K 19/0948; G06F 15/18
[52] U.S. Cl. .................................. 395/24; 327/89
[58] Field of Search ........................... 307/201, 496; 395/24; 326/115, 114; 327/52–53, 56, 77–89

[56] References Cited

U.S. PATENT DOCUMENTS

| | | | |
|---|---|---|---|
| 4,634,890 | 1/1987 | Lee | 307/496 |
| 4,866,645 | 9/1989 | Lish | 307/201 |
| 4,950,917 | 8/1990 | Holler et al. | 307/201 |
| 5,053,645 | 10/1991 | Harada | 307/201 |
| 5,097,141 | 3/1992 | Leivian et al. | 307/201 |

OTHER PUBLICATIONS

Horenstein. *Microelectronic Circuits and Devices*. N.J., Prentice Hall, 1990, pp. 45–48. TK7874.H675.

Primary Examiner—Edward P. Westin
Assistant Examiner—Jon Santamauro
Attorney, Agent, or Firm—Richard L. Donaldson; William B. Kempler

[57] ABSTRACT

A cell of MOS transistors for converting a voltage into a current for forming synapses of neural nets, in particular for converting the difference between an input voltage ($V_{IN}$) and a voltage ($V_W$) for weighting the synapse into a current, realized by means of a differential stage comprising a first transistor (M1) operating as a current generator, in which a first and a second branch in parallel end, which branches respectively comprise a second (M2) and a third (M3) push-pull connected transistor, to the gate regions of which the input voltage ($V_{IN}$) and the voltage ($V_W$) for weighting the synapse, and to which a fourth (M4) and a fifth (M5) transistor are respectively connected in series, in which the fourth (M4) and the fifth (M5) transistor are P-MOS transistors having their gate regions short-circuited and said fourth (M4) P-MOS transistor is connected as a diode, and in which the output current ($I_{OUT}$) is drawn from the node (N) that connects said third (M3) and said fifth (M5) transistors inserted in series in said second branch of the circuit and a capacitor (c) is connected to the gate region of said third (M3) transistor to store the voltage ($V_W$) for weighting the synapse applied to the circuit.

3 Claims, 2 Drawing Sheets

VOLTAGE-CURRENT CONVERSION CIRCUIT EMPLOYING MOS TRANSISTOR CELLS AS SYNAPSES OF NEURAL NETWORK

The present invention generally relates to those electronic circuits that are named neural nets because of their functional likeness to the tridimensional physiologic structures of cerebral neurons and in particular it is concerned with a cell for converting a voltage into a current to realize neural nets.

As is known, the studies on the brain have allowed us to ascertain that the nerve cells are arranged in a complex tridimensional mat that interacts through particular regions named synapses. The passage of the nerve stimulus from neuron to neuron takes place through the synapses. The process of the stimulation of a nerve cell by another nerve cell, and thus the possibility of transferring the nerve stimulus from nerve cell to nerve cell are determined at the level of the synapses. The net of the synapses between the nerve cells is tridimensional and very complex, and is developed based upon the principle of the so-called dendra, which are short, repeatedly branched cytoplasmic extensions with which a neuron contacts other neurons to transmit nerve pulses.

It is very important the ascertainment that a nerve pulse will be able to stimulate the second cell, when it reaches a synapse, only if its intensity is greater than a threshold limiting value.

A second important ascertainment is that, not forgetting the complexity of the interactions, the threshold value for transferring a pulse through a synapse is addictive, in the sense that it is the resultant of a multiplicity of components that reach the synapse at hand through said complex interactions.

A third and important ascertainment is that, therefore, the action that a nerve cell exerts on a certain synapse and thus the contributions that join a certain synapse are weighted.

With the present technological development, the necessity has been encountered, and therefore the possibility has been envisaged, of realizing nets operating based upon the three ascertainments illustrated above, and therefore defined neural nets.

A neural net, therefore, should be comprised of a multiplicity of nuclei interacting with each other such that:

a) a nucleus is affected only when the sum of the actions coming from all the nuclei that interact with it is greater than a given threshold level, which involves that b) the actions of the nuclei can be added to each other, and therefore are additive; and c) each nucleus acts with a predetermined weight, that is to say that the actions are weighted; and, as a derived, but necessary characteristic, d) the weight with which each nucleus acts is constant or rather variable, in the sense of being modifiable, but at the same time constant in the sense that it doesn't undergo undesirable or uncontrolled variations.

A possible network that is able to operate as a neural net is that represented in FIG. 1, which network comprises three nuclei A, B, C, assimilable to three neurons joining a node assimilable to a synapse, operating as an input node of a comparator CC having as its other input a reference voltage $V_{REF}$. The neurons A, B, C converge into the node N through connections DA, DB, DC assimilable to neurodendra, each one comprising a voltage-current converter cell RA, RB, RC. The nerve currents converging to the node M determine a voltage additively through a resistance R. When the voltage reached at the node N is greater than the threshold value of the comparator CC and under the hypothesis that the latter is realized, for instance, as a one-shot, we'll have one pulse on its output.

Some solutions have been just suggested for practically implementing such a network, in particular to realize its synapses. In the latter respect, attention is directed pending U.S. patent application of Ser. No. 762,817 filed Sep. 18, 1991, concerned with a non-volatile variable resistor for use in a neutral network which is based upon the use of MOS transistors with an insulated gate, in particular to realize a variable resistance value and to store such a value in a non-volatile way.

Such a solution has, however, at least two weakness or unreliability elements, which are particularly connected with the poor knowledge of the practical behaviour of an insulated-gate MOS structure, and therefore with the uncertainty of the duration and the reutilizabilty of the structure after the very numerous cycles of writing iteration to which it is to be subjected.

Starting from a neural net such as that described heretofore, the specific object of the present invention is to realize an integrated electronic structure suitable for performing the functions of said constant adjustment voltage-current converter cells that is free from the drawbacks of the known structures.

This object is achieved according to the present invention in an ideal way and basically through an integrated structure comprising a first transistor operating as a current generator and which receives the input from first and second parallel, which branches respectively comprise second and third push-pull connected transistors, to the gate regions of which the input voltage and the weighting voltage of the synapse are respectively connected, and to which respective fourth and fifth transistors are connected in series, in which the fourth and the fifth transistors are P-MOS transistors having their gate regions short-circuited and said fourth P-MOS transistor is connected as a diode, and in which the output current is drawn by the node that connects said third and said fifth transistors inserted in series in said second branch of the circuit and a capacitor is connected to the gate region of said third transistor to store the voltage for weighting the synapse applied to the circuit.

Such structures can be combined together by means of a direct connection of their output nodes, which connection takes an additive feature, in an algebraic sense, $t_o$ form the set of synapses of a neural nucleus.

In a modified embodiment, in such a combination that represents the set of synapses of a neural nucleus, such cells comprise each a first MOS transistor operating as a current generator to which a second MOS transistor, to the gate region of which the input voltage is applied, and a third MOS transistor, to the gate region of which the voltage for weighting the synapse is applied, converge in parallel, a capacitor being connected to said gate region to store said weighting voltage; the second transistors of all the cells of the combination are all connected to the negative input of a two-output differential amplifier to the positive input of which the third transistors of all the cells of the combination are, on the contrary, connected, and, moreover, current generators are connected to said positive and negative inputs of the differential amplifier, which current generators are capable of supplying them with currents $(n/2)I_{SS}$, where n is the number of the cells (synapses) of the combination and $I_{SS}$ is the current of each of said first transistors operating as current generators in each single cell; and a differential-to-single-ended converter is connected to the outputs of said differential amplifier.

Further features and advantages of the present invention will become apparent from the following disclosure with reference to the annexed drawings in which the preferred embodiments are represented in an illustrative and not limiting way:

Figure 1:
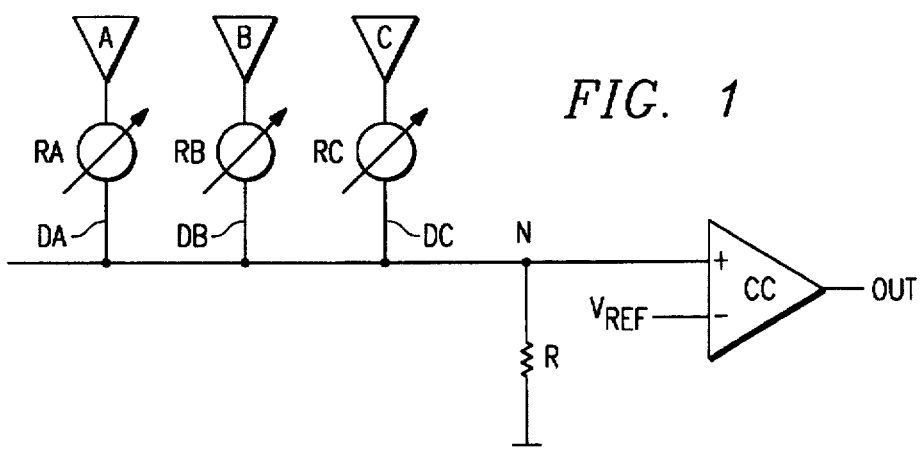
FIG. 1 shows an ideal diagram of a neural electronic net.
Figure 2:
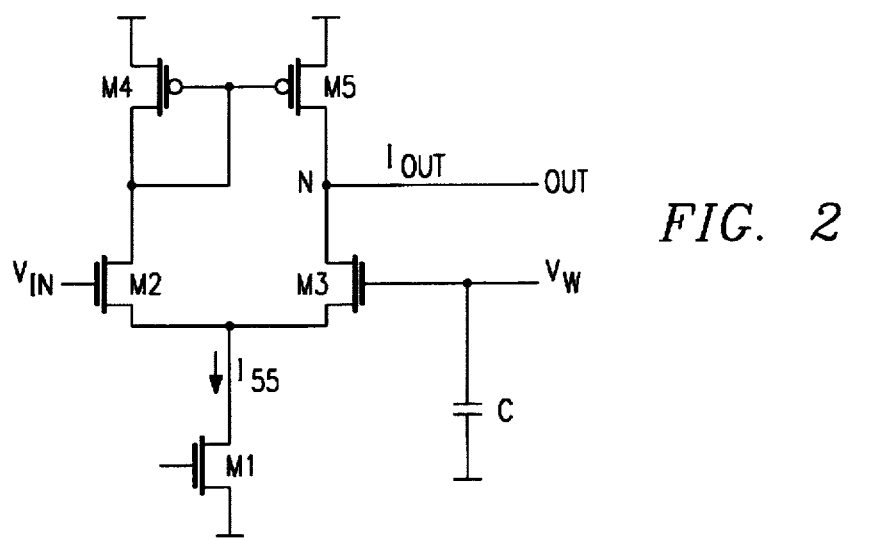
FIG. 2 shows a circuit diagram of a voltage-current converter for forming a synapse according to the present invention.

With reference to FIG. 2 and bearing in mind that it is desired to obtain on OUT an output current depending on the "weight" of the synapse here represented and in practice depending on the relationship that holds between the two voltages $V_{IN}$ and $V_W$, it is seen that the circuital implementation according to the present invention involves the use of five MOS transistors connected in a differential structure. In particular, a first transistor M1, operating as a current generator, to which two branches in parallel are connected, each of which includes two MOS transistors M2 and M3, connected in series, and, respectively, M3 and M5. The gate regions of the transistors M4 and M5 are connected to each other, and, as it is seen, the transistor M4 is connected as a diode. The gate regions of the transistors M2 and M3 are connected to the two voltages $V_{IN}$ and $V_W$, on the relationship of which the output current $I_{OUT}$ depends.

Also the capacitor C, that performs the function of storing the voltage $V_W$ applied to it, is connected to the gate region of the transistor M3.

The voltage $V_W$, in practice, is the one that sets the "weight" of the synapse and is supplied by a store that doesn't form part of the present invention. For further details, reference can be made to the pending U.S. patent application Ser. No. 828,062 filed Jan. 30, 1992 concerned with a learning system for a neural not of a suitable architecture, physically insertable in the learning process.

The capacitor C, considered as insulated, is intrinsically a storing non-volatile and permanent element but, as one cannot leave the unavoidable leakages out of consideration, in practice it loses its charge in time. In order that it can be considered non-volatile, it is necessary that a proper refresh circuitry is provided, for the details of which reference is again made to the previously mentioned U.S. patent application Ser. No. 828,062 filed Jan. 30, 1992.

Figure 4:
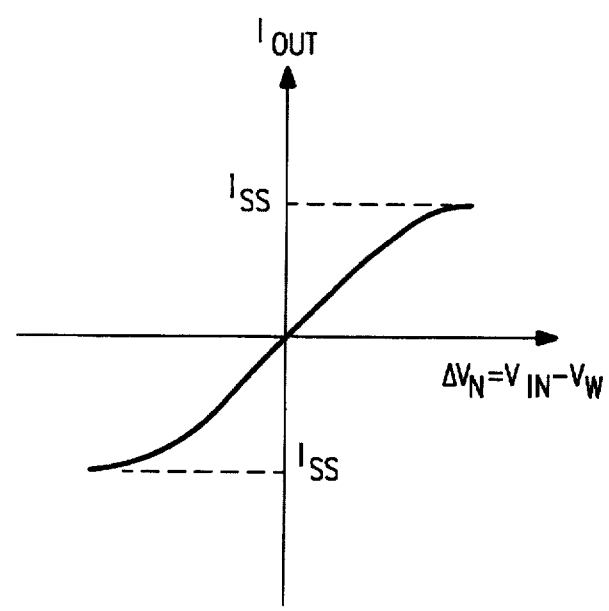
FIG. 4 shows an operation diagram $I_{OUT}$ vs $\Delta V_{IN}$ of the synapse of FIG. 2.

From the functional point of view and referring also to FIG. 4 it is seen that the differential circuit (synapse) of FIG. 2 is able to provide a positive or negative, i.e. coming into or out of the node N, output current $I_{OUT}$, which has an absolute value lying between 0 and $|I_{SS}|$, where $I_{SS}$ is the current provided by the generator transistor M1, depending on the relationship between $V_{IN}$ and $V_W$.

in particular, indicating as $\Delta V_{IN}$ the difference between $V_{IN}$ and $V_W$, the linear region of the transfer characteristic of FIG. 4 is described by the following equation:

$I_{OUT}=G_M \cdot \Delta V_{IN}$

It is seen that in practice if the two voltages $V_{IN}$ and $V_W$ are equal, the two currents passing through the transistors M2 and M3 also will be equal and also the currents passing through the transistors M4 and M5 will be equal: it is to be remarked also the diode-like connection of the transistor M4 and the short-circuit between the gate regions of the transistors M4 and M5 that are P-channel type transistors. As the currents in the transistors M3 and M5 are equal, no output current $I_{OUT}$ comes out of the summing node N.

If the voltage $V_{IN}$ is greater than the voltage $V_W$, the current in the transistor M2 and therefore the current in the transistors M4 and M5 will be equal to the current in the transistor M3, such that a current $I_{OUT}$ (positive $I_{OUT}$) will come out of the summing node N. On the contrary, if the voltage $V_{IN}$ is lower than the voltage $V_W$, the current in the transistor M3 will be greater than the current in the transistor M5, such that a current $I_{OUT}$ (negative $I_{OUT}$) will come into the summing node N.

The maximum value of $I_{OUT}$ will be naturally contained between $-I_{SS}$ and $+I_{SS}$, which is the current produced by the current generator transistor M1.

Figure 3:
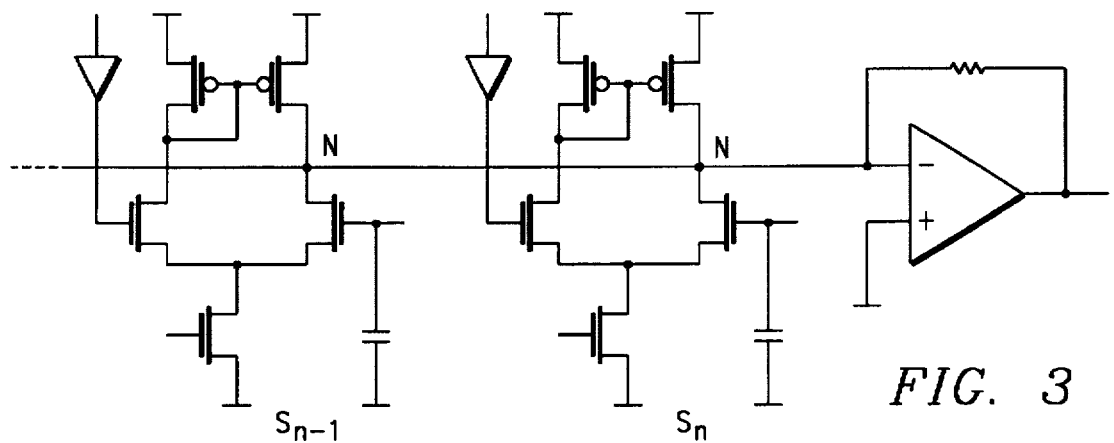
FIG. 3 shows a diagram comprising two synapses converging to a neuron.

In FIG. 3 the assembly of two synapses is represented, realized according to the circuit diagram of FIG. 2, connected in series and converging to a neuron realized as a differential amplifier, in a known manner. It is to be remarked that as the nodes N are short-circuited together, a current is applied to the negative input of the neuron, which current is the algebraic sum of the currents provided by all the synapses, the sum being performed in a way virtually "distributed" on the output nodes N of the single synapses.

Figure 5:
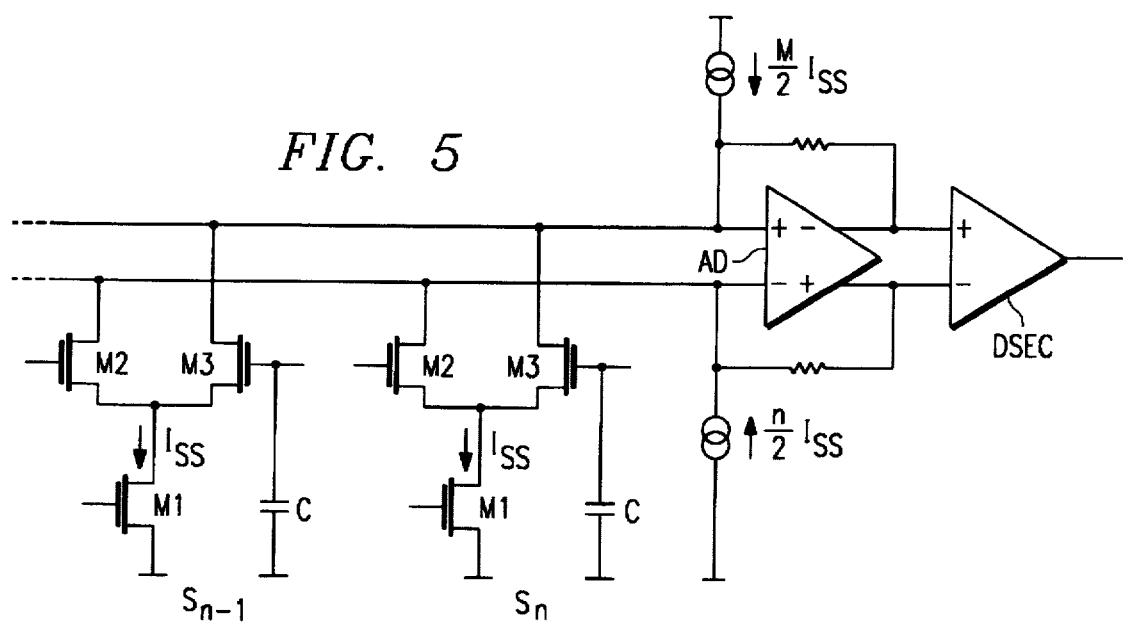
FIG. 5 shows a different embodiment of the synapse of FIG. 2 and its connection mode to realize an assembly similar to that of FIG. 3.

A different embodiment of the synapses and of their connection to the neuron, circuitally different, but functionally equivalent to the embodiment described heretofore, is represented in FIG. 5.

It is seen that in this embodiment for each synapse $S_X$ (x=1, . . . , n) the two transistors M4 and M5 have been omitted, all the drain regions of the corresponding transistors M2 are connected to each other and to the negative input of the differential amplifier AD.

As in the equilibrium state the transistor M4 of each synapse contributes for a current $I_{SS}/2$ and the transistor M5 of each synapse also contributes for a current $I_{SS}/2$ and as one has supposed that n synapses converge to the neuron, then two current generators capable of supplying currents equivalent to those provided by the transistors M4 and M5 of all the synapses, i.e. $nI_{SS}/2$, are connected to the positive and to the negative input of the differential amplifier AD.

As a completion of the equivalence of the two structures of FIG. 5 and of FIG. 3 a differential-to-single-ended converter DSEC is provided.

As has been seen heretofore, a cell has been realized capable of converting a voltage difference into a current. Compared with the structure of the previously mentioned U.S. patent application Ser. No. 762,817 filed Sep. 18, 1991, the present cell affords indisputable advantages. First of all, from a physical point of view, it is based upon already existing and largely experimented techniques, such as the use of classical and simple MOS transistors in as much classical and simple configurations. Therefore, on the one hand it doesn't have the unknown that can be associated with the behaviour of fluctuating-gate analogue devices and, on the other hand, it provides a current which is not only time-varying, as a variable resistor can do, but also sense-varying.

In the above description, the preferred embodiments of the present invention have been disclosed, but it is to be understood that those skilled in the art will be able to make modifications and variations, without departing from the scope of the invention as defined by the claims.

We claim:

1. An integrated circuit in the form of cells of MOS transistors for converting a voltage into a current in forming synapses of a neural network, said integrated circuit comprising:

a plurality of individual MOS transistor cells connected in series to form a set of synapses of a neural nucleus, each of said MOS transistor cells including
a first MOS transistor serving as a current generator,
first and second parallel branches connected at one end at a first node to said first MOS transistor,
second and third MOS transistors respectively disposed in said first and second branches and connected together in a push-pull configuration,
an input voltage terminal connected to the gate of said second MOS transistor in said first branch,
a weighting voltage terminal connected to the gate of said third MOS transistor in said second branch,
fourth and fifth MOS transistors respectively disposed in said first and second branches and serially connected to said second MOS transistor and said third MOS transistor respectively, said fourth and fifth MOS transistors having their gates connected together,
said fourth MOS transistor having its gate connected to a second node disposed in the connection between said fourth MOS transistor and said second MOS transistor such that said fourth MOS transistor is connected as a diode,
a capacitor connected between the gate of said third MOS transistor included in said second branch and said weighting voltage terminal for storing the voltage for weighting the synapse, and
a third node connected between said third MOS transistor and said fifth MOS transistor included in said second branch for drawing output current and defining the output node for the respective MOS transistor cell;

the output nodes of each of said plurality of MOS transistor cells being directly connected to each other in forming the set of synapses of a neural nucleus; and a differential amplifier having first and second inputs, the first input of said differential amplifier being connected to the output from said output nodes of said plurality of MOS transistor cells and the second input of said differential amplifier being connected to ground;

said differential amplifier having an output providing a current as the algebraic sum of the respective currents provided by each of the plurality of synapses as defined by the respective MOS transistor cells.

2. An integrated circuit as set forth in claim 1, wherein said fourth and fifth MOS transistors are PMOS transistors, and said first, second and third MOS transistors are NMOS transistors.

3. An integrated circuit in the form of cells of MOS transistors for converting a voltage into a current in forming synapses of a neural network, said integrated circuit comprising:

a plurality of individual MOS transistor cells connected in parallel to form a set of synapses of a neural nucleus, each of said MOS transistor cells including
a first MOS transistor serving as a current generator,
first and second parallel branches connected at one end at a first node to said first MOS transistor,
second and third MOS transistors respectively disposed in said first and second branches and connected together in a push-pull configuration,
an input voltage terminal connected to the gate of said second MOS transistor in said first branch,
a weighting voltage terminal connected to the gate of said third MOS transistor in said second branch, and
a capacitor connected between the gate of said third MOS transistor included in said second branch and said weighting voltage terminal for storing the voltage for weighting the synapse;

a differential amplifier having first and second inputs and first and second outputs;

said second MOS transistors of each of said plurality of MOS transistor cells being connected to the first input of said differential amplifier;

said third MOS transistors of each of said plurality of MOS transistor cells being connected to the second input of said differential amplifier;

first and second current generators respectively connected to the first and second inputs of said differential amplifier;

a differential-to-single-ended converter connected to the outputs of said differential amplifier; and said first and second current generators having a capability of providing currents of $(n/2)I_{SS}$ to the first and second inputs of said differential amplifier, where n is the number of the MOS transistor cells, and $I_{SS}$ is the current provided by each of said first MOS transistors serving as current generators in each of said plurality of individual MOS transistor cells.

* * * * *